United States Patent
Hoelzl et al.

[11] Patent Number: 5,523,666
[45] Date of Patent: Jun. 4, 1996

[54] BATTERY-CHARGING DEVICE FOR AN ELECTRIC VEHICLE

[75] Inventors: Guenter Hoelzl, Hochdorf; Stefan Eberhardt, Backnang; Joachim Trost, Nuertingen, all of Germany

[73] Assignee: Daimler-Benz AG, Stuttgart, Germany

[21] Appl. No.: 364,460

[22] Filed: Dec. 27, 1994

[30] Foreign Application Priority Data

Dec. 24, 1993 [DE] Germany ............... 43 44 563.2

[51] Int. Cl.⁶ ................................................. H02J 7/00
[52] U.S. Cl. ................................................. 320/2; 439/32
[58] Field of Search ........................... 320/2; 439/32, 439/34

[56] References Cited

U.S. PATENT DOCUMENTS

| | | | |
|---|---|---|---|
| 3,603,860 | 9/1971 | Johnson | 320/2 |
| 3,904,947 | 9/1975 | Crews | 320/2 |
| 4,193,655 | 3/1980 | Herrman, Jr. | 339/31 R |
| 5,049,802 | 9/1991 | Mintus et al. | |
| 5,252,078 | 10/1993 | Langenbahn | 439/34 |
| 5,413,493 | 5/1995 | Hoffman | 439/188 |
| 5,441,416 | 8/1995 | Gajewski et al. | 439/32 |

FOREIGN PATENT DOCUMENTS

| | | |
|---|---|---|
| 2929067 | 2/1981 | Germany. |
| 3902339 | 8/1990 | Germany. |
| 1282974 | 7/1972 | United Kingdom. |
| 2185866 | 7/1987 | United Kingdom. |

*Primary Examiner*—Peter S. Wong
*Assistant Examiner*—Kyung Shin
*Attorney, Agent, or Firm*—Evenson, McKeown, Edwards & Lenahan

[57] ABSTRACT

A battery-charging device for an electric vehicle contains on the vehicle side a transmitter for transmitting vehicle-specific data which contains an item of information about the instantaneous height position of a contact element on the vehicle side. The charging station has a receiver for receiving the transmitted data, a charge control unit connected to the receiver, as well as a height adjustment device for the charging station which can be controlled by the charge control unit. In this manner, the vehicle can be electrically coupled to the charging station in a reliable and automatic manner when driving the vehicle up to the charging station.

12 Claims, 2 Drawing Sheets

BATTERY-CHARGING DEVICE FOR AN ELECTRIC VEHICLE

BACKGROUND AND SUMMARY OF THE INVENTION

The invention relates to a battery-charging device for an electric vehicle and, more particularly, to a battery-charging device, for an electric vehicle having a contact element arranged on the vehicle side and a stationary charging station having a contact element which can be made to automatically make contact with the contact element on the vehicle side at a specific height above the ground as a result of the approaching movement of the vehicle.

German Patent document DE-A 29 29 067 A1 discloses a known battery-charging device. The contact elements are designed in the known device on the vehicle front side or on the charging-station side in such a manner that they are pressed against one another for the purpose of making charge contact by driving the vehicle up to the charging station. In this manner, no separate actuating means are necessary for making contact with the contact elements.

For this purpose, track rails are arranged in front of the stationary charging station. The track rails are downwardly inclined in the direction of the charging station and form a positive guide for an arriving electric vehicle. In the charging position, the vehicle is therefore located on an oblique plane with the front side being downwardly inclined. As a result, the contact elements arranged on the vehicle front side remain pressed against the contact elements fitted to the charging station at a corresponding height. To ensure that reliable contact is made even in the event of noticeable differences in height, e.g. in the case of different vehicle loading states, the contact elements which lie against each other are designed in this location as contact rails. The rails run in a manner intersecting each other. Alternatively, a contact element is designed as a contact pin and the complementary contact element is as a contact plate which slides thereon. In each case, two interacting pairs of contact elements are arranged at a horizontal distance from one another.

A further known battery-charging device is disclosed in Great Britain Patent document GB 1 282 974. The stationary charging station comprises two supporting posts, to which a holder is screwed for two charging contact pins. The contact pins are horizontally displaceable on the holder above C-members. The holder, for its part, can be manually adjusted in terms of height by releasing the screw connections, adjusting the holder along slotted guides in the support posts, and again fastening the screw connections. In this manner, the contact pins can be manually set to a height position which is suitable for a respective electric vehicle. The contact pins engage automatically into two contact slots, fitted on the front side of the vehicle at a horizontal distance, for the purpose of making contact when the vehicle approaches the charging station.

For the purpose of automating the charging operation to a large extent, communications are provided in the case of newer battery-charging devices between a control unit on the vehicle side and a control unit on the charging-station side. The control units often also include computers. So, for example, in a known battery-charging device disclosed in Laid-open Great Britain Patent document GB 2 185 866 A, a control computer on the vehicle side communicates with a control computer on the charging-station side via an RS232 interface or an inductive coupling. In a further battery-charging device of this kind, shown in U.S. Pat. No. 5,049,802, the control on the vehicle side communicates via radio contact with a control unit on the charging-station side which controls the charging operation. In this case, data is conveyed by the control unit on the vehicle side by radio contact. The data contain, inter alia, an item of information about the fact that the vehicle is connected, ready to be charged, to the charging station as well as concerning the instantaneous charging state of the battery so that the charging operation can be set in a corresponding manner by the charge control unit.

Radio communication between a charging station and an electric vehicle is also provided in the case of a data-collecting arrangement for a battery-driven vehicle as disclosed in German Patent document DE-A 39 02 339 A1. Vehicle-specific and/or battery-specific data that has been collected on the vehicle side can be transmitted to an evaluation unit in the charging station. The evaluation unit evaluates the received data for the purpose of controlling the charging operation.

There is therefore needed a battery-charging device of the above-mentioned type, which allows vehicles having different loads, or of different vehicle types, to be automatically coupled in a simple and reliable manner to a stationary charging station. The battery-charging device should allow a reliable, automatic charging operation.

These needs are met according to the present invention by a battery-charging device for an electric vehicle having a contact element arranged on the vehicle side and a stationary charging station having a contact element which can be made to automatically make contact with the contact element on the vehicle side at a specific height above the ground as a result of the approaching movement of the vehicle. A transmitter is provided for transmitting data which contains an item of information about the instantaneous height position of the contact element on the vehicle side. The charging station contains a receiver for the data transmitted by the transmitter, a charge control unit connected to the receiver, as well as a height adjustment device. The height adjustment device can be driven by the charge control unit for the contact element on the station side.

It is an advantage of the present invention that it is possible to detect on the vehicle side the instantaneous height position of the vehicle side contact element which changes, for example, due to different loading states for the same vehicle, or which can also be different for different types of vehicles even in the empty state. The height position can be transmitted as an item of information to the charging station whose charge control unit evaluates this item of information and undertakes a matching adjustment in terms of height for the contact element on the station side. Thus, the interacting contact elements are located at a mutually matching level when the vehicle approaches the charging station and contact can be made automatically as a result of driving up to the charging station.

An advantageous embodiment of the invention provides a cover to protect the busbars against soil, humidity and unauthorized touching when no vehicle battery to be charged is connected. In order for the automatic coupling of the vehicle to the charging station to remain nevertheless possible, the cover can be moved, via control by the charge control unit, into a corresponding release position.

As a result of a further advantageous embodiment of the invention, contact is made and, thus, a charging current flows only when the contact peg is completely inserted into the associated contact rail and that a relatively large contact surface is available.

If the charging operation is carried out, as usual, using two contact connections, then it is a further advantage to provide a rubber buffer, provided between the contact rails, for protecting rear charging station parts from being damaged when the vehicle is coupled and, additionally, contributing to the protection from being touched since the rubber buffer prevents the two busbars from being touched at the same time.

In a preferred embodiment, the battery-charging device has a control device on the vehicle side for controlling the transmitter. In a further development of this embodiment, the control device on the vehicle side preferably detects the data which the charge control unit requires for controlling a desired charging operation, e.g. data about an imminent charging operation and/or about the type of battery and/or about the charging state of the battery. The control unit on the vehicle side passes this data on to the transmitter for transmission to the charging station. Furthermore, the control device on the vehicle side can be used for driving the contact element on the vehicle side when this is arranged between a charging position and a quiescent position in a manner so as to be movable on the vehicle. The contact element is directed into the charging position by the control device after a user request has been received for charging the battery.

It is a further advantage of the present invention that a level matching can be achieved in an advantageous manner in the case of changes of the vehicle loading state during a battery charging operation.

Other objects, advantages and novel features of the present invention will become apparent from the following detailed description of the invention when considered in conjunction with the accompanying drawings.

DETAILED DESCRIPTION OF THE DRAWINGS

Figure 1:
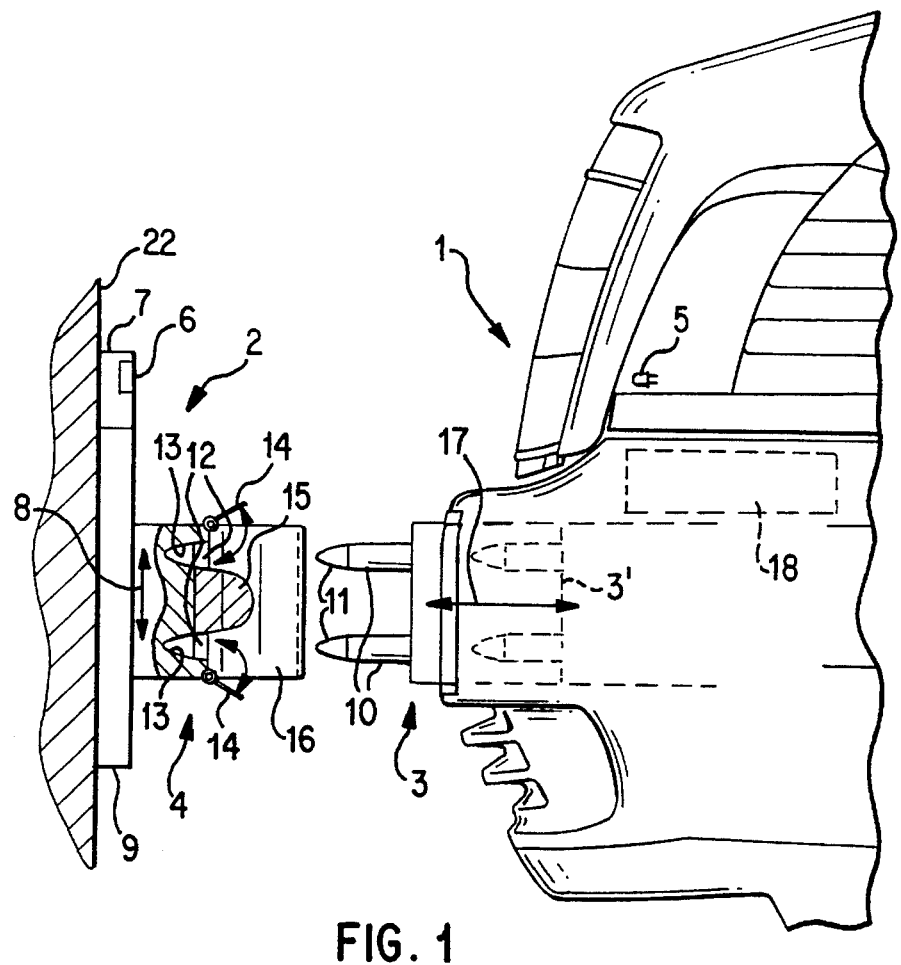
FIG. 1 is a partial side view of a battery-charging device having a stationary charging station and, located in front of it, an electric vehicle.

FIG. 1 illustrates in a side view the front face of an electric vehicle 1 located in front of a stationary charging station 2. A contact element 3 located on the vehicle side for connecting a vehicle battery (not shown) to a charging-current-generating charging station 2 is arranged in the vehicle front face inside a bumper region below a radiator grill. The contact element 3 has two contact pegs 10 for the two battery terminals. The contact pegs 10 lie vertically one above the other. Each contact peg 10 consists of an electrically insulated basic body and an electrically conductive contact probe 11. The contact probe tapers off in a convex manner, that is to say, with an increasing tangential slope. The contact element 3 is held on the vehicle so as to be longitudinally displaceable along an arrow 17 and is in this manner displaceable between an extended charging position, which is shown on the left-hand side of FIG. 1 drawn with continuous lines, and a retracted quiescent position 3' indicated with broken lines.

In the charging position, the contact element 3 is held pressed forward in a resiliently elastic manner so that, when a preselectable counterpressure is exceeded, it can recede backward. The displacing movement is controlled by a control device 18, likewise arranged in the front region of the vehicle. The control device 18 additionally serves to detect vehicle-specific and battery-specific data, so that, using this data, the control device 18 can signal, in particular, that recharging of the vehicle battery has become necessary, as well as for correspondingly controlling a transmitter 5 likewise arranged in the front region of the vehicle. The data is communicated to the transmitter by the control device.

In this manner, the control device 18 on the vehicle serves to put the vehicle 1 into a state ready for charging, as soon as this is desired. The necessary measures are carried out after they have been requested by the user. The user has previously been signalled via a display device (not shown) that it is necessary to charge the battery as determined by the control device 18 on the vehicle side from the battery-specific data, particularly data about the charging state of the battery.

Figure 3:
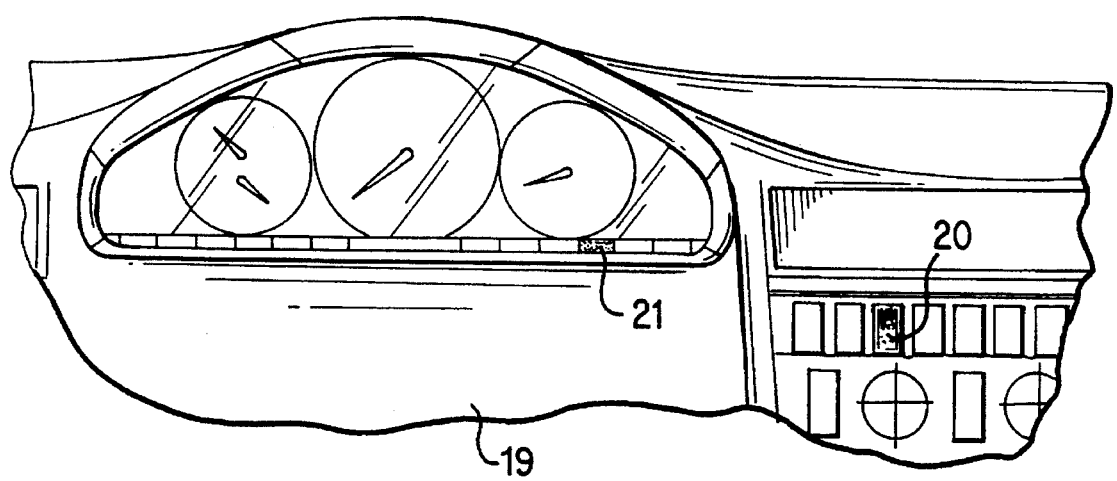
FIG. 3 is a partial top view of an instrument panel of the electric vehicle of FIG. 1.

The user request is carried out by an operation key, shown in FIG. 3, on the instrument panel 19 of the vehicle. The key is connected in a signal-conveying manner to the vehicle side control device 18. As soon as the control device 18 obtains a corresponding signal, it activates the vehicle transmitter 5, conveys to it the data necessary for controlling the charging operation, for example, an item of information about an imminent charging operation and items of information about the charging state of the battery, and activates the actuating device (not shown here in detail). The actuating device extends the contact element 3 on the vehicle side from the quiescent position 3' forwardly into the charging position 3.

Charging takes place by using the stationary charging station 2 which, for this purpose, is equipped as follows. On an immovably fixed wall 22, a charge device 9 is held by conventional means (not shown explicitly here) so as to be displaceable in terms of height as indicated by the arrow 8. A charge control unit 7 is located at the upper side of the charging device 9. The charge control unit includes a computer unit as well as a receiver 6 for receiving the data emitted by the transmitter 5 on the vehicle side. The receiver 6 is connected to the charge control unit 7 for the purpose of routing these data. A contact element 4 on the charging-station side is arranged at the front side of the charging device 9. The contact element comprises two horizontally running contact rails 12 which lie vertically one above the other, have a concave cross-sectional shape which envelopes contact probes 11 of the contact pegs 10 in a matching manner, and are inserted into recesses of a rubber buffer 15. The rubber buffer 15 protrudes forwards in its central region which is located between the contact rails 12. This forwardly protruding rubber buffer region protects the charging device 9 from damage when the vehicle 1 is driven up and contributes to the protection from being physically touched since it keeps the two contact rails 12 electrically insulated from one another and prevents the two busbars from being touched at the same time, for example, due to an incorrectly positioned contact peg 10.

As a result of this design of the rubber buffer 15, the electrically conductive rear contact rail region 13, which interacts with the contact probes 11 of the contact pegs 10, is in a position which is noticeably moved back with respect to the central, bulged-up rubber buffer region, which ensures that contact is made between the contact rail 12 and contact peg 10 only after the contact peg 10 is completely introduced into the contact rail 12.

In addition to the ability to be adjusted in terms of height, the charging device 9 and thus the contact element 4 on the charging-station side, are fitted to the charging-station wall 22 so as to be resilient in the vertical direction to an extent which is sufficient to compensate slight offsets between the contact element 4 on the charging-station side and the contact element 3 on the vehicle side. Further, they are fitted so as to possibly permit a compensation in terms of levelling in case the loading state of the vehicle changes during the charging operation.

Figure 2:
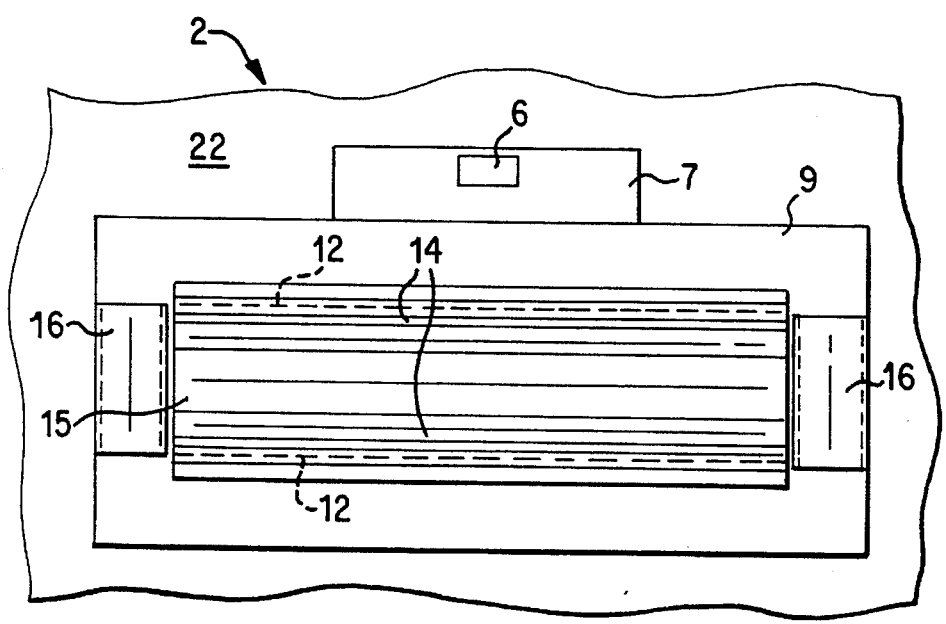
FIG. 2 is a partial front view of the charging station of FIG. 1.

Each contact rail 12 is covered in a region, open towards the front and serving to introduce the corresponding contact peg 10, by a respectively associated cover flap 14. The cover flaps 14 are mounted on the charging device 9 so as to be pivotably movable, for protecting against soil, humidity and unauthorized touching when no battery charging operation takes place, as is shown in FIG. 2. As can be further seen from FIG. 2, the contact rails 12 have a noticeable horizontal extent which ensures that the contact element 3 on the vehicle side reliably makes contact with the contact element 4 on the charging-station side without the need for the vehicle 1 to be driven up to the charging station 2 with precise lateral adjustment. This is because the contact element 3 on the vehicle side does not necessarily have to be coupled centrally to the charging device 9.

To prevent the contact rails 12 from being touched unintentionally or without authorization during a charging operation, thick rubber bellows 16 are fitted as lateral screenings for the contact rails 12 on the charging device 9. The bellows 16 come to rest in the charging position of the vehicle 1 on its vehicle front and, in this way, screen the charging device 9 on the sides. During a charging operation, the contact rails 12 are screened upwardly and downwardly by the cover flaps 14 for carrying out a charging operation, by pivoting the cover flaps from the cover position shown in FIG. 2 into the open position shown in FIG. 1. This pivoted movement thus releases, on the one hand, the contact rails 12 and, on the other hand, screens the rails upwardly and downwardly. The pivoting movement of the cover plates 14 into the open position or into the cover position is in each case carried out by a conventional actuating device, which is not shown, which is driven for this purpose by the charge control unit 7.

The following sequence of a battery-charging operation results from the above-described construction of the battery-charging device.

As soon as the vehicle driver is informed by a display by the control device 18 on the vehicle side about the need for recharging the vehicle battery and has driven, for this purpose, up to the stationary charging station 2, he actuates the charge-request key 20 on the instrument panel 19 (FIG. 3). This informs the control device 18 on the vehicle side of the desired charging operation, after which the control device extends the contact element 3 on the vehicle side from the quiescent position 3' into the charging position 3. In the charging position, the contact element 3 is held resiliently for achieving a smooth coupling. In addition, the control device 18 activates the transmitter 5 and feeds it with the data required for the charging operation, in particular data in terms of readiness for charging, vehicle specifications, charging state of the battery, current height position of the contact element 3 on the vehicle side as a function of the loading state of the vehicle, as well as data of the charging voltage required by the vehicle. The data emitted by the transmitter 5 is received by the receiver 6 in the charging station 2 and passed on to the charge control unit 7. As a result, the charge control unit 7 is informed about the imminent charging operation and receives the required items of information for carrying out a charging operation which is matched in an optimum manner to the vehicle which stands at the device. Conveying the data, which is specific for the charging operation, to the charge control unit 7 makes the arrangement of a charging regulator in the vehicle dispensable. This data, in particular, also contains an item of information about the instantaneous height position above the ground of the contact element 3 on the vehicle side. This information is utilized by the charge control unit 7 for initially moving the charging device 9 and thus the contact element 4, fitted on the front on the charging-station side, to a matching height. In this matching height, the contact rails 2 are in each case at equal height with respect to the associated contact peg 10, through height adjustment 8 by correspondingly driving the associated actuating device. At the same time, as a result of the recognized, imminent charging operation, the charge control unit 7 drives the actuating device for the cover flaps 14 in such a manner that the cover flaps 14 are pivoted from their cover position into the open position in which they release the contact rails 12 towards the front and screen them upwardly and downwardly. In addition, the charge control unit 7 ensures that the operation of loading the contact rails 12 with the charging voltage begins.

As soon as the charging device 9 is adjusted in terms of its height and the cover flaps 14 are open, by further driving the vehicle 1 forward in the direction of the charging station 2, the charging device 9 and vehicle battery are electrically coupled as a result of the electrically conductive contact rail surfaces 13 making contact with the contact probes 11 of the contact pegs 10. The contact pegs 10 are inserted as a result of the forward movement of the vehicle and the extended nature of the contact element 3 on the vehicle side. Contact is made as soon as the contact pegs 10 are completely inserted into the contact rails 12. As a result of the specific, mutually matched design of the convex contact probes 11 on the one hand and of the concave contact rail surfaces 13 on the other hand, electrical contact is present over the entire axial length of the contact probes 11. Therefore, a comparatively large contact surface is provided. A slight further forward movement of the vehicle 1 leads, on account of the fact that the contact element 3 on the vehicle side is mounted in its pushed-forward charging position so as to be compliant in a resiliently elastic manner, to this contact element being pushed back against the elastic dynamic effect so that damage to the charging device 9 and, in particular, to the contact rails 12, can be avoided. The elastic coupling is furthermore supported in that the central, bulged-out region of the rubber buffer 15 comes to bear against the contact element 3 on the vehicle side in its region between the contact pegs 10. Elastic matching in terms of level is furthermore achieved in the vertical direction as a result of the resilient mounting of the charging device 9 on the charging-station wall 22 in this direction.

After the corresponding control units have recognized that the vehicle has coupled in completely and contact has thus been made between the contact element 3 on the vehicle side and the contact element 4 on the charging-station side, a charging voltage is applied to the contact rails 12 by the charging device 9 and the battery-charging operation begins as a result. As soon as this charging operation is initiated by coupling the contact elements 3, 4 and by thus starting the charging current, this is detected by the control device 18 on the vehicle side and signalled to the vehicle driver by a contact control lamp 21 arranged, as shown in FIG. 3, on the instrument panel 19 and connected to the said control device 18. By continuously monitoring the battery voltage, the control device 18 on the vehicle side recognizes the end of the charging operation, whereupon the control device 18 emits a signal to the corresponding setting device for retracting the contact element 3 on the vehicle side. The contact made between the contact element 3 on the vehicle side and the contact element 4 on the charging-station side is released again in consequence and the charging current is interrupted. This is recognized by the charge control unit 7 which then again pivots, by means of the corresponding actuating device, the cover flaps 14 from their open position into the cover position in which the contact rails 12 are covered towards the front.

The above-described battery-charging apparatus clearly ensures a simple and reliable charging operation with high operating comfort. No charging regulator is required in the vehicle, nor are any long cable lines needed. It is readily understood that those skilled in the art can carry out obvious variations of the above arrangement in the framework of the invention depending on the type of charging station and/or vehicle used and the respective desires with respect to comfort, having in particular a large selection in terms of information data exchanged between the charging station and vehicle. For example, by arranging a transmitter in the charging station and a corresponding receiver in the vehicle, a bi-directional wireless information exchange can be provided. In addition, the transmitter on the vehicle side can possibly be used for other purposes, e.g. as an aid for parking. It is also to be noted that electric vehicles can be retrofitted without difficulties with the part on the vehicle side of the charging device according to the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A battery-charging device for an electric vehicle, comprising:

a vehicle side contact element arranged on the electric vehicle;

a stationary charging station having a charging station contact element arranged so as to automatically make contact with said vehicle side contact element at a specific height above a ground level as a result of an approaching movement of the electric vehicle;

a vehicle side transmitter arranged on the electric vehicle for transmitting data containing an item of information about an instantaneous height position of said vehicle side contact element;

a charging station receiver arranged in said stationary charging station for receiving said data transmitted from said transmitter;

a height adjustment device arranged in said charging station; and a charge control unit arranged in said charging station connected to said receiver and said height adjustment device, wherein said height adjustment device is driven by said charge control unit for adjusting the height of said charging station contact element by moving said charging station contact element.

2. Battery-charging device according to claim 1, wherein said charging station contact element comprises at least one substantially horizontally running contact rail extending transverse to a longitudinal axis through the vehicle; and further comprising a cover assigned to said at least one contact rail, said cover being movable under control of said charge control unit, between a cover position and an open position.

3. Battery-charging device according to claim 2, wherein said vehicle side contact element comprises at least one contact peg having a contact probe which is carried by an insulating body and tapers off in one of a convex and wedge-shaped manner, a contact surface of the contact rail, arranged in a rear region thereof and having a cross-sectional shape which envelopes the contact probe in a matching manner, interacts with the contact probe.

4. Battery-charging device according to claim 3, wherein said vehicle side contact element and said charging station contact element comprise two contact pegs and two contact rails, respectively, said two contact pegs lying vertically one above the other and said two contact rails lying vertically one above the other; further comprising a rubber buffer which extends between the contact rails.

5. Battery-charging device according to claim 1, further comprising a control device arranged on the electric vehicle which controls the transmitter.

6. Battery-charging device according to claim 5, wherein the control device on the vehicle side collects data, specific to a charging operation, and conveys said data to the transmitter for transmission by which said charge control unit controls the charging operation.

7. Battery-charging device according to claim 5, further comprising:

a signal transmitter operable by a user and connected to the control device on the vehicle side, said signal transmitter being provided for requesting a charge;

wherein the vehicle side contact element is arranged so as to be movable, controlled by the control device on the vehicle side, between a charging position and a quiescent position; and wherein the control device on the vehicle side, upon receiving a signal from the signal transmitter, directs the vehicle side contact element into the charging position and activates the transmitter.

8. Battery-charging device according to claim 6, further comprising:

a signal transmitter operable by a user and connected to the control device on the vehicle side, said signal transmitter being provided for requesting a charge;

wherein the vehicle side control element is arranged so as to be movable, controlled by the control device on the vehicle side, between a charging position and a quiescent position; and wherein the control device on the vehicle side, upon receiving a signal from the signal transmitter, directs the vehicle side contact element into the charging position and activates the transmitter.

9. Battery-charging device according to claim 1, wherein the charging station contact element is mounted on an immovable charging-station wall so as to be resilient in the vertical direction.

10. Battery-charging device according to claim 6, wherein the charging station contact element is mounted on an immovable charging-station wall so as to be resilient in the vertical direction.

11. Battery-charging device according to claim 7, wherein the charging station contact element is mounted on an immovable charging-station wall so as to be resilient in the vertical direction.

12. A battery-charging device for an electric vehicle, comprising:

a vehicle side contact element arranged on the electric vehicle;

a stationary charging station having a charging station contact element arranged so as to automatically make contact with said vehicle side contact element at a specific height above a ground level as a result of an approaching movement of the electric vehicle;

a vehicle side transmitter arranged on the electric vehicle for transmitting data containing an item of information about an instantaneous height position of said vehicle side contact element;

a charging station receiver arranged in said stationary charging station for receiving said data transmitted from said transmitter;

means for adjusting the height of said charging station contact element; and a charge control unit arranged in said charging station connected to said receiver and said height adjustment means, wherein said height adjustment means is driven by said charge control unit for moving said charging station contact element.

\* \* \* \* \*